(12) United States Patent
Kaneko et al.

(10) Patent No.: US 8,218,116 B2
(45) Date of Patent: Jul. 10, 2012

(54) LIQUID CRYSTAL DISPLAY PANEL AND MANUFACTURING METHOD THEREOF

(75) Inventors: Hideki Kaneko, Tottori (JP); Masahiro Horiguchi, Tottori (JP)

(73) Assignee: Sony Corporation, Tokyo (JP)

( * ) Notice: Subject to any disclaimer, the term of this patent is extended or adjusted under 35 U.S.C. 154(b) by 764 days.

(21) Appl. No.: 12/179,773

(22) Filed: Jul. 25, 2008

(65) Prior Publication Data

US 2009/0033855 A1    Feb. 5, 2009

(30) Foreign Application Priority Data

Aug. 1, 2007   (JP) ................................. 2007-200435
May 13, 2008   (JP) ................................. 2008-125571

(51) Int. Cl.
*G02F 1/1343*   (2006.01)
(52) U.S. Cl. ...................... 349/141; 349/138; 349/149
(58) Field of Classification Search .................. None
See application file for complete search history.

(56) References Cited

U.S. PATENT DOCUMENTS

| | | | |
|---|---|---|---|
| 7,142,274 B2 * | 11/2006 | Kitagawa et al. ............. | 349/141 |
| 7,639,331 B2 | 12/2009 | Sonoda et al. | |
| 2004/0239857 A1 * | 12/2004 | Yoshikawa .................... | 349/139 |
| 2005/0024571 A1 * | 2/2005 | Nakayoshi et al. ........... | 349/141 |
| 2005/0105032 A1 * | 5/2005 | Ono et al. ..................... | 349/139 |
| 2007/0171319 A1 | 7/2007 | Fujita et al. | |
| 2009/0262287 A1 * | 10/2009 | Nishida ........................ | 349/114 |

FOREIGN PATENT DOCUMENTS

| | | |
|---|---|---|
| JP | 2001-235763 | 8/2001 |
| JP | 2002-182230 | 6/2002 |
| JP | 2004-094020 | 3/2004 |
| KR | 2007-45936 | 5/2007 |
| KR | 10-0744404 | 7/2007 |

\* cited by examiner

*Primary Examiner* — Lucy Chien
(74) *Attorney, Agent, or Firm* — K&L Gates LLP

(57) ABSTRACT

A mounting terminal portion 33A of an FFS mode liquid crystal display panel includes a gate insulator 14 and a passivation film 17 covering a surface of a wiring 34 for a mounting terminal, a contact hole 36a penetrating therethrough, a first transparent conductive film 38 electrically connected to the wiring 34 for a mounting terminal, an insulator 23 formed with an opening 36b having a smaller diameter than the diameter of the contact hole 36a in a central part of the first transparent conductive film 38, and a mounting terminal formed of a second transparent conductive film 41 electrically connected to the first transparent conductive film 38.

9 Claims, 8 Drawing Sheets

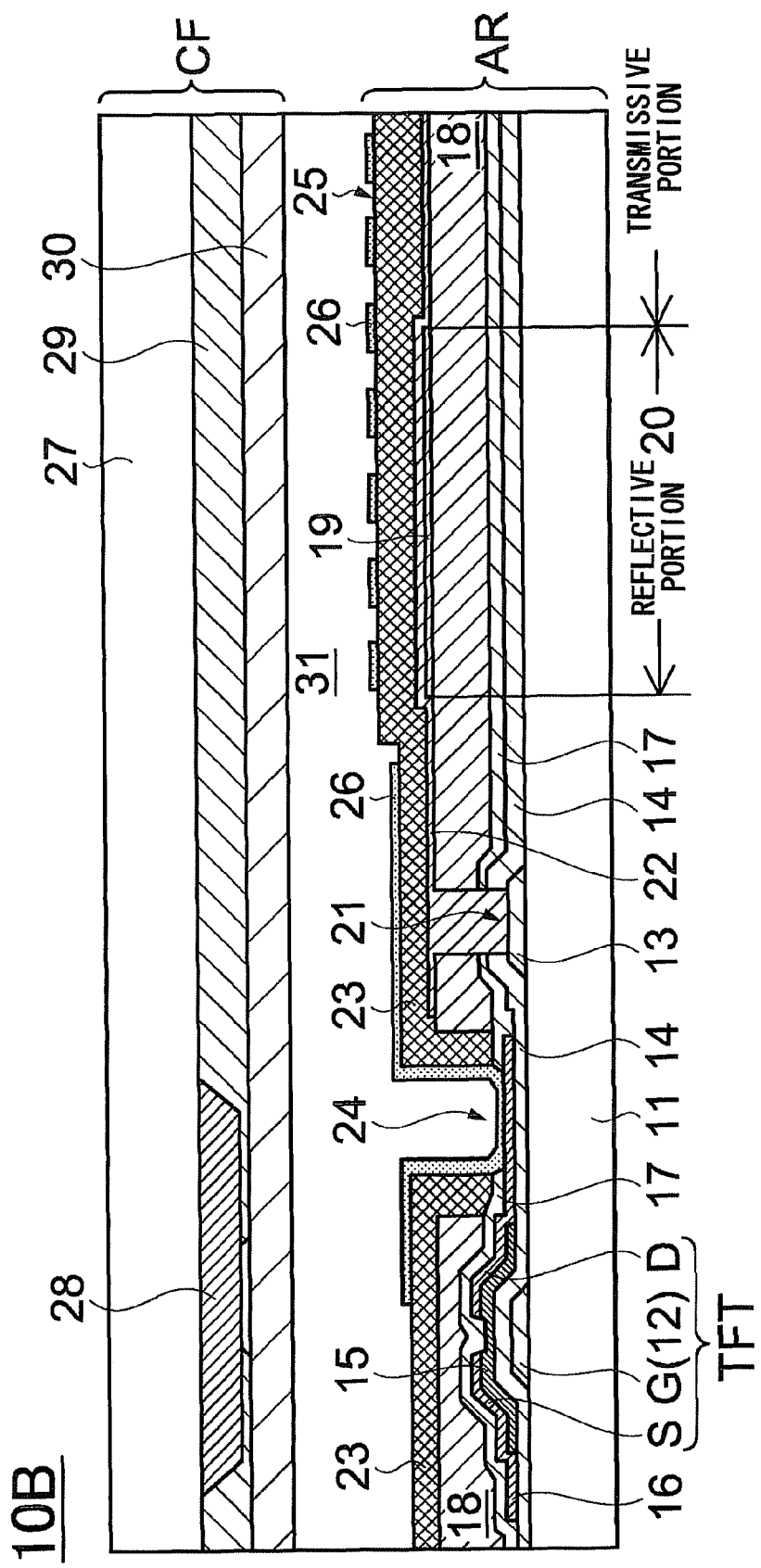

LIQUID CRYSTAL DISPLAY PANEL AND MANUFACTURING METHOD THEREOF

BACKGROUND

1. Technical Field

The present invention relates to a fringe field switching (FFS) mode liquid crystal display panel in which a pixel electrode and a common electrode are arranged on a planar film, so as to prevent a problem such as an increase in wiring resistance due to disconnection and corrosion, while various members are mounted on a mounting terminal portion, and a manufacturing method thereof.

2. Related Art

Vertical electric field type liquid crystal display panels that include a pair of transparent substrates formed with an electrode and the like on the surface and a liquid crystal layer sandwiched between the pair of substrates, which display various pieces of information by rearranging liquid crystals by applying voltage to the electrodes on both substrates, have been widely used. Typical vertical electric field type liquid crystal display panels are in a twisted nematic (TN) mode, but because there is the problem of a narrow viewing angle, various improved vertical electric field type liquid crystal display panels such as a vertical alignment (VA) mode and a multi-domain vertical alignment (MVA) mode have been developed.

In addition to the above-described vertical electric field type liquid crystal display panel, a liquid crystal display panel in an in-plane switching (IPS) mode or a FFS mode, which is also known as a transverse electric field type liquid crystal display panel that provides a pair of electrodes formed of a pixel electrode and a common electrode only on one substrate, is also known.

The IPS mode liquid crystal display panel disposes a pair of electrodes on the same layer, and rearranges liquid crystal molecules in a direction parallel to a substrate, by setting the direction of the electric field applied to the liquid crystal as the direction substantially parallel to the substrate. Therefore, the IPS mode liquid crystal display panel has an advantage of having an extremely wide viewing angle compared to the above described vertical electric field type liquid crystal display panel. However, in the IPS mode liquid crystal display panel, a pair of electrodes is provided on the same layer to apply the electric field to the liquid crystal. Accordingly, the liquid crystal molecules placed at the upper side of the pixel electrode are not fully driven, thereby causing a problem such as low transmittance.

To solve such a problem of IPS mode liquid crystal display panels, FFS mode liquid crystal display panels have been developed (see JP-A-2001-235763 and JP-A-2002-182230). In FFS mode liquid crystal display panels, the pixel electrode and the common electrode are disposed to apply the electric field to the liquid crystal layer, on the different layers with an insulator interposed therebetween. FFS mode liquid crystal displays panel have a wider viewing angle and a higher contrast than IPS mode liquid crystal display panels, are capable of operating at low voltage, and allow a brighter display due to their higher transmittance. In addition, in an FFS mode liquid crystal display panel, because an overlapping area between the pixel electrode and the common electrode is larger than that of the IPS mode liquid crystal display panel in planar view, there is an advantage of secondarily generating a larger storage capacitance, thereby eliminating the need to provide a separate auxiliary capacitor line.

A configuration of a mounting terminal portion formed at a periphery of a related art liquid crystal display panel will now be explained with reference to FIGS. 8A and 8B.

FIG. 8A is a sectional view of a related art mounting terminal portion of a lower wiring, and FIG. 8B is a sectional view of a related art mounting terminal portion of an upper wiring.

The manufacturing of the mounting terminal portion is performed simultaneously with the manufacturing of scanning lines or signal lines in an array substrate of the liquid crystal display panel. Therefore, there are a mounting terminal portion connected to a lower wiring 52 simultaneously manufactured with the manufacturing of the scanning lines and a gate electrode on a transparent substrate 51, as shown in FIG. 8A, and a mounting terminal portion connected to an upper wiring 54 formed simultaneously with the signal lines on a gate insulator 53 that covers the surface of the transparent substrate 51, as shown in FIG. 8B. The surfaces of the upper wiring 54 and the gate insulator 53 are covered with a passivation film (also referred to as protective insulator) 55.

A mounting terminal 56 for the lower wiring 52, as shown in FIG. 8A, is formed of a transparent conductive material, via a contact hole 57 formed so as to simultaneously penetrate through the passivation film 55 and the gate insulator 53, at the same time when the pixel electrode is formed. Similarly, a mounting terminal 58 for the upper wiring 54, as shown in FIG. 8B, is formed of the transparent conductive material via a contact hole 59 formed so as to penetrate through the passivation film 55, at the same time when the pixel electrode is formed. Therefore, the lower wiring 52 and the upper wiring 54 are exposed to an etching atmosphere once, while the contact holes 57 and 59 are formed by using photolithography. The mounting terminals 56 and 58 for the lower wiring 52 and the upper wiring 54 formed in this manner, are respectively provided at higher positions than the lower wiring 52 and the upper wiring 54, and provided so as the widths are larger than those of the lower wiring 52 and the upper wiring 54, thereby improving electrical contact with various connecting members connected to the mounting terminals 56 and 58.

With the related art FFS mode liquid crystal display panel, a step is formed on the surface of the pixel electrode overlapping with a switching element such as a thin film transistor (TFT) and a common line, thereby disturbing the alignment of the liquid crystal molecules at the step portion. Consequently, in the related art FFS mode liquid crystal display panel, because the step portion is a region that does not actually contribute to the display, the step portion is shielded by a black matrix on a color filter substrate, thereby reducing aperture ratio just as much as the step.

To eliminate such a step, by using a planar film used in the liquid crystal display panel in the VA mode and the MVA mode, the pixel electrode and the common electrode may be disposed on the planar film. However, if such a configuration is adopted in the FFS mode liquid crystal display panel, on the planar film, the pixel electrode and the common electrode are respectively disposed on different layers with an insulator interposed therebetween. Accordingly, the insulator formed on the surface of the lower wiring or the upper wiring is increased by one layer, while the mounting terminal portion is formed at the periphery. A process of simultaneously forming the contact hole in the pixel portion, while forming the contact hole to expose the lower wiring or the upper wiring of the mounting terminal portion, by using photolithography, will be now explained. An opening portion is formed in a gate insulator (nitride film) and a protective film (nitride film) layered at a contact hole forming position of the mounting terminal portion, and after a common electrode is formed on the planar film layered excluding the mounting terminal portion, an insulator (nitride film) is layered on the entire surface. An opening portion is then again formed and penetrated through to a potential line, at the contact hole forming position of the mounting terminal portion. While forming the pixel electrode in the pixel portion, an electrode made of the same material as the common electrode is formed in the contact hole of the mounting terminal portion. However, in this method, the lower wiring or the upper wiring are exposed to the etching atmosphere as much as twice.

Because the lower wiring and the upper wiring are formed of metal with good conductivity but susceptible to corrosion, such as aluminum or aluminum alloy, the damage is increased when the lower wiring and the upper wiring are exposed to the etching atmosphere of the insulator, as much as twice. Accordingly, a problem such as an increase in wiring resistance due to disconnection and corrosion may occur while being mounted.

Therefore, each electrode wiring is prevented from being exposed to the etching atmosphere by, rather than providing an opening to the gate insulator (nitride film) and the protective film (nitride film) at the contact hole disposing position of the mounting terminal portion while the contact hole of the pixel electrode is being opened, but by etching the contact holes of the mounting terminal portion in bulk after the insulator interposed between the pixel electrode and the common electrode is formed. However, with this process, because the film quality between the insulator, and the gate insulator and the protective film differ, thereby having different etching rates. Consequently, problems occur in that the insulator is formed in a reverse taper shape, a step is generated between respective nitride films, a step disconnection occurs while the contact portion is covered by the upper electrode, which prevents them from being in contact with one another.

SUMMARY

The present invention has been made to solve at least some of the above problems, and can be realized by the following configurations or application examples.

FIRST APPLICATION EXAMPLE

According to an aspect of the invention, a liquid crystal display panel includes an array substrate having a display region and a mounting terminal portion formed at a periphery of the display region. The display region includes a plurality of scanning lines and signal lines formed in a matrix, and a lower electrode and an upper electrode that has a plurality of slits, each of the lower and upper electrodes being made of a transparent conductive material formed on a planar film, and disposed opposite to each other with an insulator interposed therebetween in each region surrounded by the scanning lines and the signal lines. The mounting terminal portion includes a first insulator that covers the surface of a wiring for a mounting terminal, a contact hole formed so as to penetrate through the first insulator on the wiring for a mounting terminal, a first conductive film that at least covers part of the bottom portion of the contact hole and is electrically connected to the wiring for a mounting terminal, a second insulator that is provided on the surface of the first insulator and has an opening at least part of which is overlapped with the contact hole in planar view, and a second conductive film that covers the surface of the second insulator around the contact hole. The first conductive film and the second conductive film are electrically connected in the opening.

With this configuration, the display region includes the plurality of scanning lines and signal lines formed in a matrix, and the lower electrode and the upper electrode that has a plurality of slits, each of the lower and upper electrodes being made of a transparent conductive material formed on the planar film, and disposed opposite to each other with an insulator interposed therebetween in each region surrounded by the scanning lines and the signal lines. With such a configuration, the liquid crystal display panel can be operated as an FFS mode liquid crystal display panel.

In the liquid crystal display panel, the lower electrode and the upper electrode that has the plurality of slits, each of the lower and upper electrodes being made of a conductive material, and disposed opposite to each other with an insulator interposed therebetween, are formed on the planar film. Therefore, no step is formed by a switching element, a common line, and the like on the lower electrode and the upper electrode. Accordingly, in the liquid crystal display panel, an interval, in other words, a cell gap between the other substrate and the upper electrode is uniform, thereby increasing the aperture ratio, because an area of a region that needs to be shielded by the black matrix decreases in the display region. Therefore, with the liquid crystal display panel, it is possible to obtain an FFS mode liquid crystal display panel that allows a bright display and good display quality. In the FFS mode liquid crystal display panel, both the upper electrode and the lower electrode can be operated as a pixel electrode or a common electrode. In other words, out of the upper electrode and the lower electrode, one electrode connected to the switching element serves as a pixel electrode, and the other electrode connected to the common line serves as a common electrode.

In addition, with the liquid crystal display panel, the surface of the wiring for a mounting terminal associated with the mounting terminal portion is covered by the first conductive film. Therefore, when the opening is formed in the vicinity of the middle portion of the second insulator, using photolithography, the surface of the wiring for a mounting terminal is not exposed, thereby reducing damage to the wiring for a mounting terminal. Accordingly, with the liquid crystal display panel, the problem such as the increase in wiring resistance due to disconnection and corrosion while mounting a predetermined member on the mounting terminal portion does not occur. As a result, it is possible to obtain an FFS mode liquid crystal display panel with a reliable mounting portion.

SECOND APPLICATION EXAMPLE

In the liquid crystal display panel according to an aspect of the invention, it is preferable that the second insulator cover the inner circumference surface and the peripheral surface of the contact hole, and include the opening having a smaller diameter than the diameter of the contact hole at the vicinity of a middle portion of the contact hole.

With this configuration, the second insulator is formed to the inner circumference of the contact hole. Accordingly, for example, even if the second insulator is rapidly etched in an etching atmosphere and eroded to the wall of the contact hole, because the area of the surface covered by the second insulator is large, the periphery of the contact hole, which is the mounting portion of the mounting terminal portion, will not be eroded. Consequently, the height of the mounting portion can be maintained. As a result, it is possible to prevent the variation in height in the respective mounting terminal portions, thereby enabling to prevent the generation of non-contact portions.

THIRD APPLICATION EXAMPLE

In the liquid crystal display panel according to an aspect of the invention, it is preferable that the second insulator be formed at the periphery of the contact hole.

With this configuration, because the second insulator is not formed to the bottom portion of the contact hole, but provided at the periphery of the contact hole, the contact area between the first conductive film and the second conductive film increases. As a result, it is possible to reduce the resistance of each mounting terminal portion, thereby enabling a stable voltage supply.

FOURTH APPLICATION EXAMPLE

In the liquid crystal display panel according to an aspect of the invention, it is preferable that the first conductive film be electrically connected to the wiring for a mounting terminal, and formed so as to cover the bottom portion of the contact hole.

With this configuration, because the first conductive film is formed so as to cover the bottom portion of the contact hole (the surface of the wiring for a mounting terminal), the wiring for a mounting terminal can be prevented from being exposed to the etching atmosphere. As a result, it is possible to protect the wiring for a mounting terminal further effectively.

FIFTH APPLICATION EXAMPLE

In the liquid crystal display panel according to an aspect of the invention, it is preferable that the first conductive film be electrically connected to the wiring for a mounting terminal, and formed at a part of a region on the surface of the wiring for a mounting terminal.

With this configuration, because the first conductive film is electrically connected to the wiring for a mounting terminal, and formed at a part of the region on the surface of the wiring for a mounting terminal, in the forming region, even if the exposed surface is damaged to some extent in the etching atmosphere, it is possible to protect the wiring for a mounting terminal.

SIXTH APPLICATION EXAMPLE

In the liquid crystal display panel according to an aspect of the invention, it is preferable that the first conductive film and the second conductive film be formed of the same material as the lower electrode and the upper electrode, respectively, and the second insulator be formed of the same material as the insulator disposed between the lower electrode and the upper electrode.

With this configuration, because the mounting terminal portion can be formed while the display region is formed, the display region and the mounting terminal portion can be formed without increasing the number of work processes. The "same material" not only means being formed of the same material, but also means, for example, if one has a multilayer structure, the other also has the same multilayer structure.

A transparent conductive material such as indium tin oxide (ITO) or indium zinc oxide (IZO) may be used for the lower electrode and the upper electrode. In this case, the lower electrode and the upper electrode may be the same composition or may differ in their composition. A transparent organic insulator that at least has a plane surface may be used for the planar film, and a transparent resin such as acrylic resin and polyimide may be used therefor. An inorganic insulator such as silicon oxide and silicon nitride may be used for various insulators.

SEVENTH APPLICATION EXAMPLE

In the liquid crystal display panel according to an aspect of the invention, it is preferable that the wiring for a mounting terminal be formed of the same metal material as that of the scanning lines in the display region, and the first insulator be formed of a multilayer film made of the same material as the gate insulator that covers over the scanning lines and the passivation film that covers over the signal lines in the display region.

With this configuration, because the scanning lines in the display region are generally formed as a lower wiring directly on the transparent substrate, the surface of the wiring for a mounting terminal formed simultaneously with the scanning lines is covered by both the gate insulator and the passivation film. Accordingly, both the gate insulator and the passivation film serve as the first insulator. With the liquid crystal display panel having this feature, even if the wiring for a mounting terminal is the low wiring formed directly on the substrate, it is possible to obtain a liquid crystal display panel that offers the foregoing advantages of the invention. In the above-described configuration, both the gate insulator and the passivation film serve as the first insulator, but the insulator formed on the wiring for a mounting terminal corresponds to the first insulator, whether being one layer or two layers.

EIGHTH APPLICATION EXAMPLE

In the liquid crystal display panel according to an aspect of the invention, it is preferable that the wiring for a mounting terminal be formed of the same metal material as that of the signal lines in the display region, and the first insulator be formed of a film made of the same material as the passivation film that covers over the signal lines in the display region.

With this configuration, because the signal lines in the display region are generally formed as an upper wiring on the surface of the gate insulator, and the surface of the wiring for a mounting terminal formed simultaneously with the signal lines is covered by the passivation film, the passivation film serves as the first insulator. With the liquid crystal display panel having this feature, even if the wiring for a mounting terminal is the upper wiring on the surface of the gate insulator, it is possible to obtain a liquid crystal display panel that offers the foregoing advantages of the invention.

NINTH APPLICATION EXAMPLE

In the liquid crystal display panel according to an aspect of the invention, a reflector be partially formed between the planar film and the lower electrode of the display region.

With the liquid crystal display panel having this feature, a portion where the reflector is partially formed between the planar film and the lower electrode operates as a reflective portion, and the other portion operates as a transmissive portion. As a result, it is possible to obtain an FFS mode semi-transmissive liquid crystal display panel.

TENTH APPLICATION EXAMPLE

According to another aspect of the invention, in a manufacturing method of a liquid crystal display panel that includes a plurality of scanning lines and signal lines formed in a matrix, a display region that includes a lower electrode and an upper electrode that has a plurality of slits, each of the lower and upper electrodes being formed of a transparent conductive material formed on a planar film, and disposed opposite to each other with an insulator interposed therebetween in each region surrounded by the scanning lines and the signal lines, and a mounting terminal portion formed around the display region, the mounting terminal portion is manufactured by the following steps of (1) to (7): (1) forming a wiring for a mounting terminal in a predetermined pattern formed of the same material as the scanning lines or the signal lines, at a mounting terminal forming position on a substrate surface, (2) covering the surface of the wiring for a mounting terminal by a first insulator, (3) forming a contact hole so as to penetrate through the first insulator on the wiring for a mounting terminal, (4) forming a first conductive film formed of the same material as the lower electrode, so as to cover at least part of a bottom portion of the contact hole and to be electrically connected to the wiring for a mounting terminal, (5) forming a second insulator having the same composition as the insulator disposed between the lower electrode and the upper electrode of the display region, on the surface of the first insulator, (6) forming an opening at least part of which is overlapped with the contact hole in planar view, in the second insulator, and (7) forming a mounting terminal made of a second conductive film formed of the same material as the upper electrode so as to cover the surface of the second insulator around the contact hole and to be electrically connected to the first conductive film in the opening.

With the manufacturing method of the liquid crystal display panel according to the present aspect of the invention, it is possible to manufacture a liquid crystal display panel that offers the foregoing advantages in a simple manner.

BRIEF DESCRIPTION OF THE DRAWINGS

The invention will be described with reference to the accompanying drawings, wherein like numbers reference like elements.

FIG. 6 is a sectional view taken along the line VI-VI in FIG. 5.

DESCRIPTION OF EXEMPLARY EMBODIMENTS

Exemplary embodiments of the invention will now be described using various embodiments with reference to the drawings. However, the following embodiments exemplify an FFS mode liquid crystal display panel as a liquid crystal display panel to substantiate the technical thought of the invention, and the invention is not intended to be specified by the FFS mode liquid crystal display panel. The invention may be equally applied to other embodiments within the scope of the appended claims.

Figure 1:
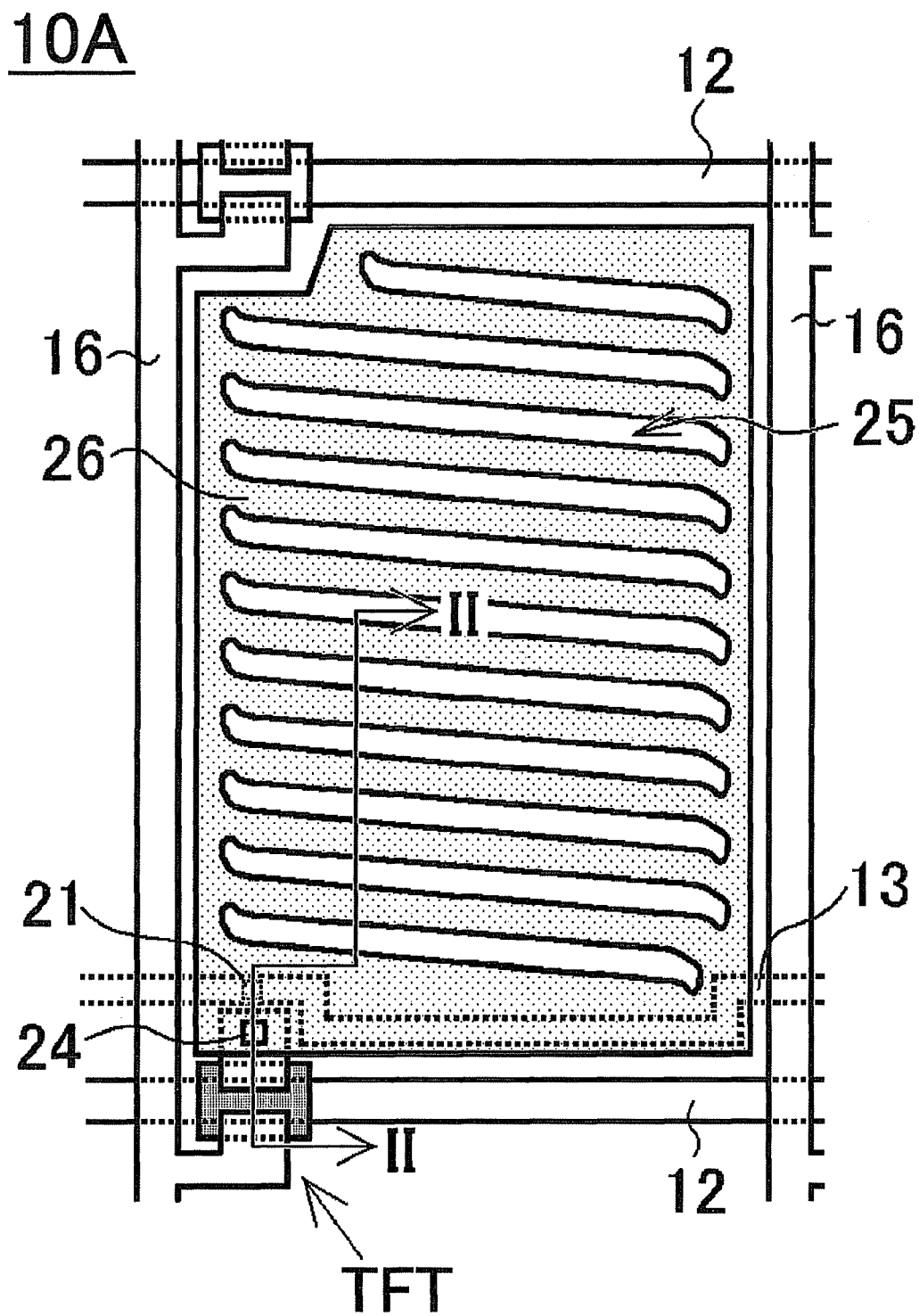
FIG. 1 is a schematic plan view of one pixel of an array substrate seen through a color filter substrate of an FFS mode liquid crystal display panel according to a first embodiment.
Figure 2:
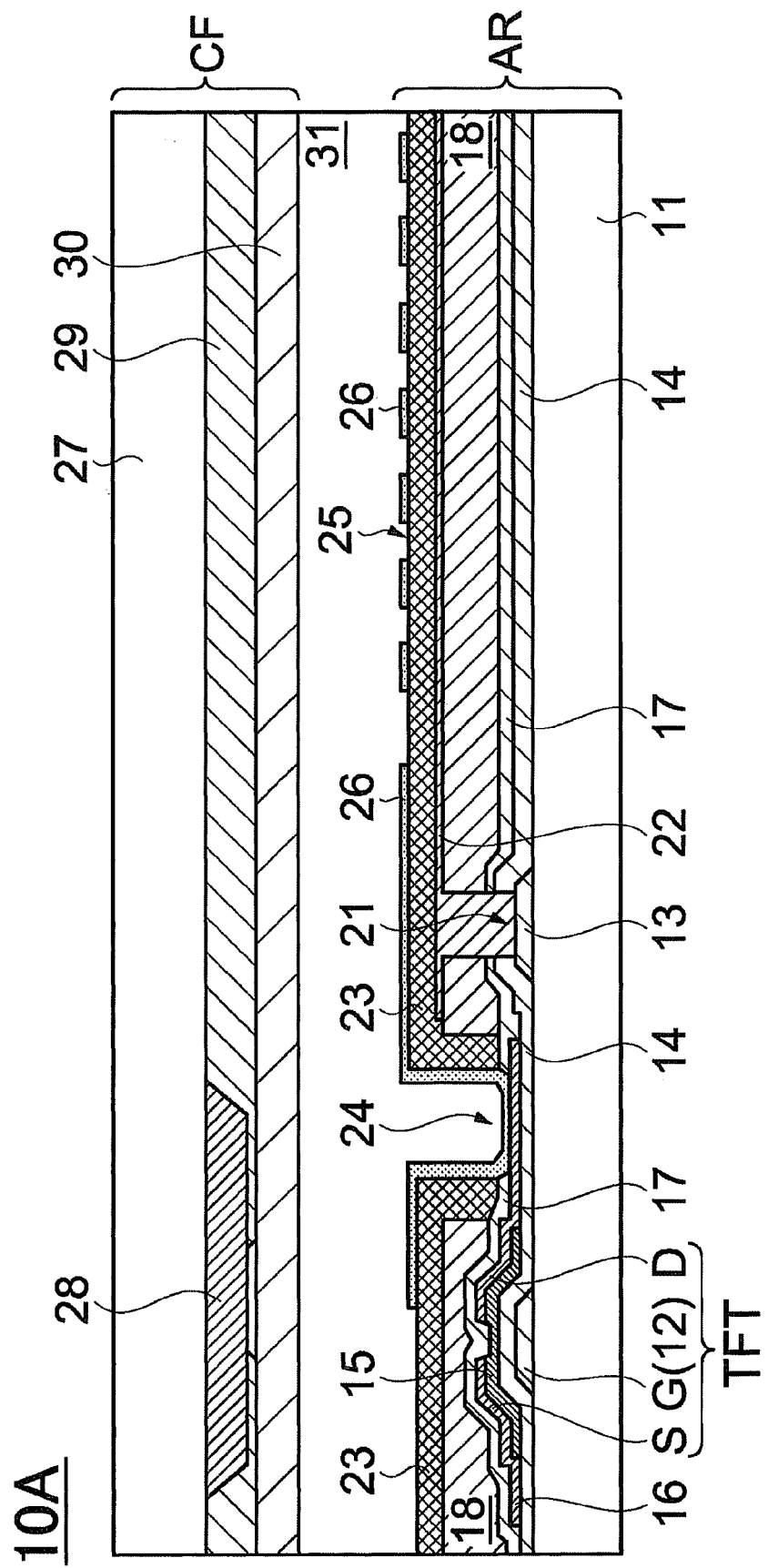
FIG. 2 is a sectional view taken along the line II-II in FIG. 1.
Figure 3:
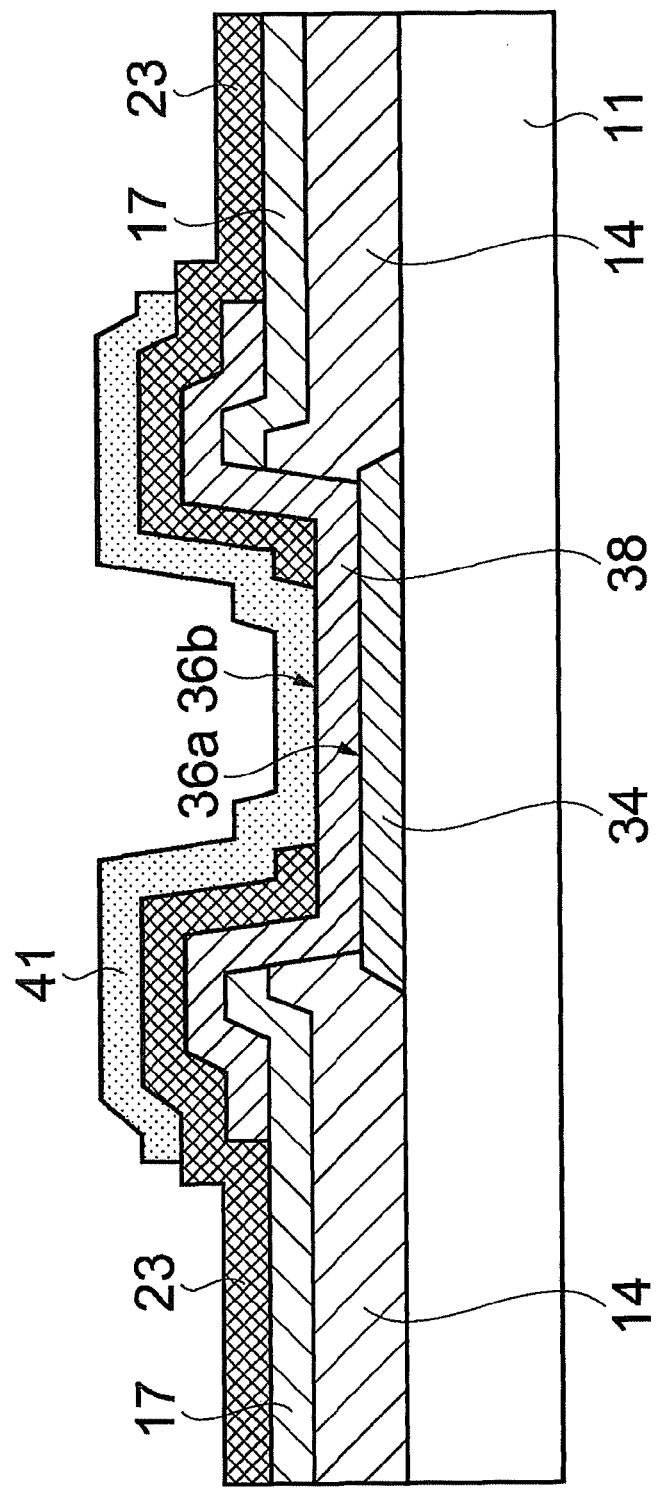
FIG. 3 is a schematic sectional view of a terminal portion of a lower wiring of the liquid crystal display panel according to the first embodiment.
Figure 4:
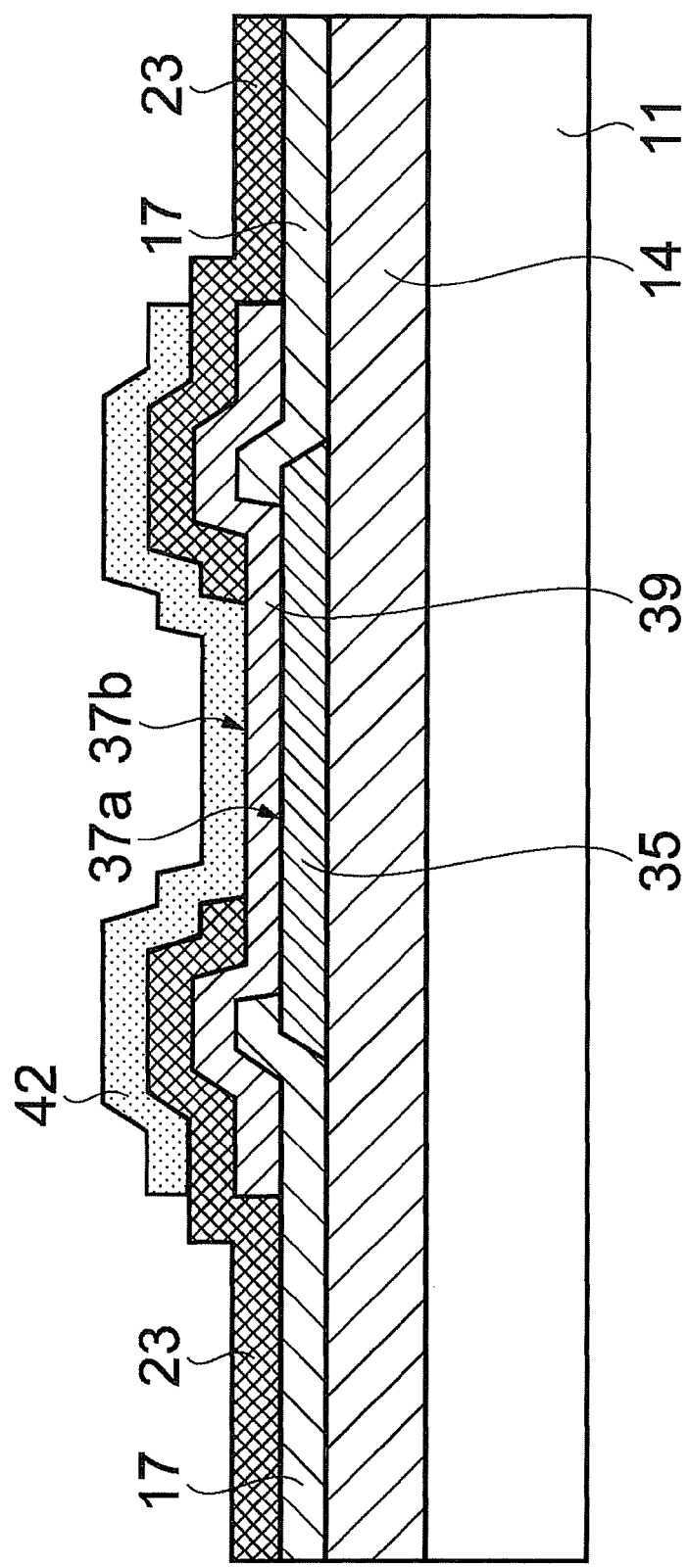
FIG. 4 is a schematic sectional view of a terminal portion of an upper wiring of the liquid crystal display panel according to the first embodiment.
Figure 5:
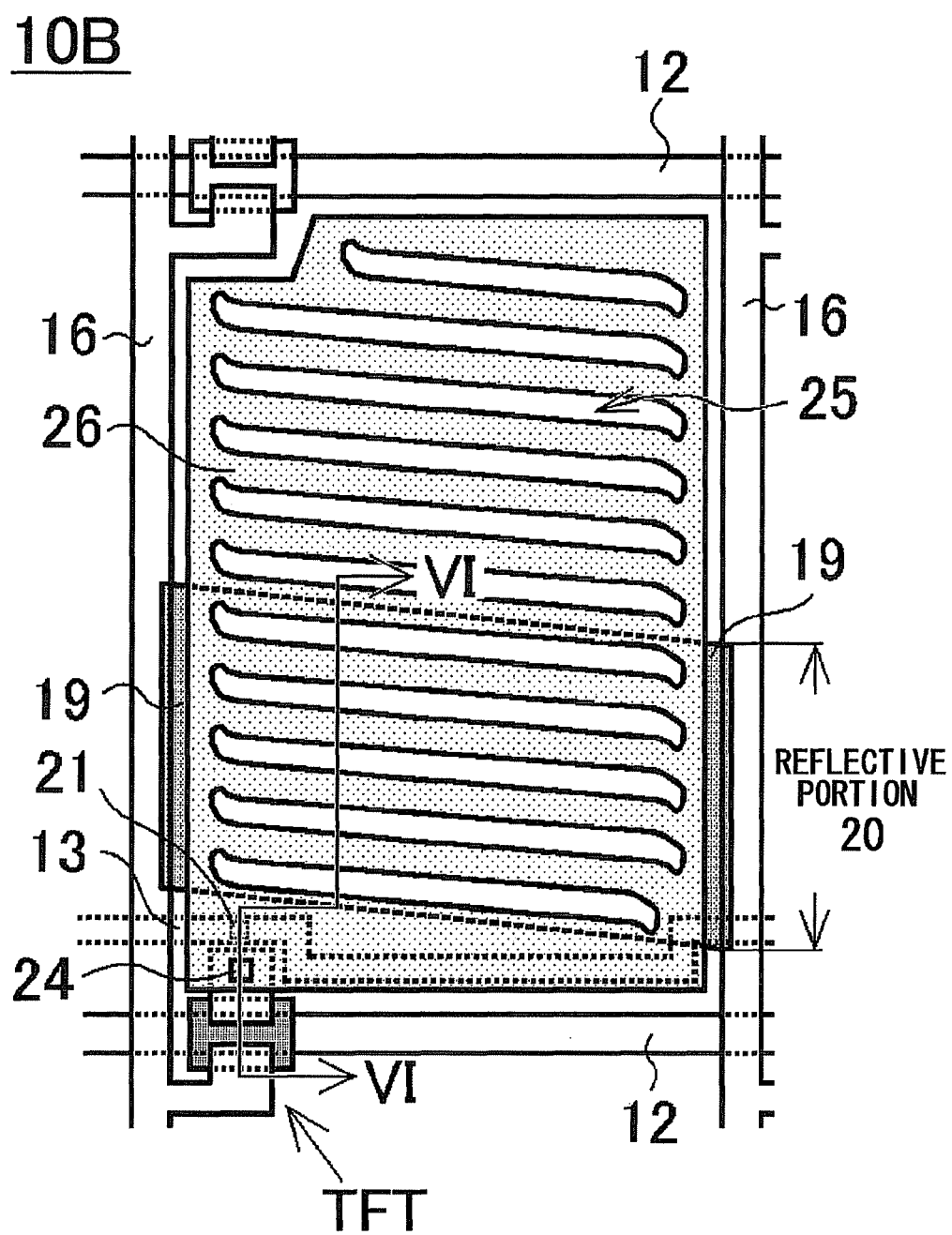
FIG. 5 is a schematic plan view of one pixel of an array substrate seen through a color filter substrate of an FFS mode semi-transmissive liquid crystal display panel according to a second embodiment.

FIG. 1 is a schematic plan view of one pixel of an array substrate seen through a color filter substrate of an FFS mode liquid crystal display panel 10A according to a first embodiment. FIG. 2 is a sectional view taken along the line II-II in FIG. 1. FIG. 3 is a schematic sectional view of a terminal portion of a lower wiring of the liquid crystal display panel according to the first embodiment. FIG. 4 is a schematic sectional view of a terminal portion of an upper wiring of the liquid crystal display panel according to the first embodiment. FIG. 5 is a schematic plan view of one pixel of an array substrate seen through a color filter substrate of an FFS mode semi-transmissive liquid crystal display panel according to a second embodiment. FIG. 6 is a sectional view taken along the line VI-VI in FIG. 5.

First Embodiment

An example of an FFS mode liquid crystal display panel 10A that has a planar film will now be explained with reference to FIGS. 1 to 4 in the manufacturing process sequence, as the FFS mode liquid crystal display panel according to the first embodiment. To manufacture an array substrate AR in the liquid crystal display panel 10A, a conductive layer made of, for example, aluminum or aluminum alloy is at first formed over an entire surface of a transparent substrate 11 such as a glass substrate. Then, by using a known photolithography method and an etching method, a plurality of scanning lines 12 and a plurality of common lines 13 are formed parallel to each other on a display region. A wiring 34 for a mounting terminal made of a gate line is formed on a mounting terminal portion 33A for lower wiring (see FIG. 3) at a periphery of the display region. The gate line is not necessarily used as the wiring for the scanning lines 12, but called the "gate line", because the same material as the scanning lines 12 is used for the wiring, and may be suitably used for various wirings, although not shown. Here, an example is shown of the common line 13 formed along the scanning line 12 of the pixel of the common line 13. However, the common line 13 may be formed along the side of the scanning line 12 of the adjacent pixel, or may be formed between the two scanning lines 12.

A gate insulator 14 made of a silicon nitride layer or a silicon oxide layer is then covered over the entire surface. The entire surface of the gate insulator 14 is covered by, for example, an amorphous silicon (hereinafter, referred to as "a-Si") layer using a chemical vapor deposition (CVD) method, and then a semiconductor layer 15 made of the a-Si layer is formed in a TFT forming region, by using photolithography and an etching method. The region of the scanning line 12 at a position where the semiconductor layer 15 is formed is forming a gate electrode G of the TFT.

A conductive layer made of, for example, aluminum or aluminum alloy is then formed on the surface of the gate insulator 14 and the semiconductor layer 15. From the conductive layer, by using photolithography and an etching method, a signal line 16 that includes a source electrode S is formed so as to intersect with the scanning lines 12 in the display region, a drain electrode D is formed in the TFT forming region, and a wiring 35 for a mounting terminal made of a source line is formed in a mounting terminal portion 33B for upper wiring (see FIG. 4). The source line, as in the case of the gate line, is not necessarily used as the wiring for the signal line 16, but is called the "source line", because the same material as the signal line 16 is used for the wiring, and is suitably used for various wirings, although not shown.

A passivation film 17 is covered over the entire surface of the transparent substrate 11 obtained by the above process. The passivation film 17 made of the silicon nitride layer or the silicon oxide layer may be used, but from an insulation point of view, the silicon nitride layer is preferable. Among these, the gate insulator 14 and the passivation film 17 present on the surface of the wiring 34 for a mounting terminal associated with the mounting terminal portion 33A for lower wiring correspond to a first insulator of the invention, and the passivation film 17 present on the surface of the wiring 35 for a mounting terminal associated with the mounting terminal portion 33B for upper wiring also corresponds to the first insulator.

Contact holes 21 and 36a are respectively formed in the gate insulator 14 and the passivation film 17 on the surfaces on the common line 13 and on the wiring 34 for a mounting terminal associated with the mounting terminal portion 33A for lower wiring. At the same time, a contact hole 37a is formed in the passivation film 17 on the wiring 35 for a mounting terminal associated with the mounting terminal portion 33B for upper wiring. The contact holes 21, 36a, and 37a may be formed by adopting a plasma etching method, which is a kind of dry-etching method, and a wet etching method using buffer hydrofluoric acid. Accordingly, the surfaces of the common line 13 and the wirings 34 and 35 for mounting terminals are exposed. At this time, a contact hole is not yet formed in the passivation film 17 on the drain electrode D. A planar film (also referred to as interlayer) 18 made of, for example, acrylic resin or polyimide resin is layered on the surface of the passivation film 17 in the display region, excluding the portion of the contact hole 21 and a portion on the drain electrode D where a contact hole is to be formed, using photolithography.

A transparent conductive layer made of, for example, ITO and IZO is covered over the entire surface of the transparent substrate 11 where the planar film 18 is formed thereon. Then, using photolithography and an etching method, a lower electrode 22 is formed on the surface of the planar film 18 in each pixel. Also, first transparent conductive films 38 and 39 are respectively formed, so as to cover the surfaces of the wirings 34 and 35 for mounting terminals, and the passivation film 17 around the wirings 34 and 35 for mounting terminals. At this time, the lower electrode 22 in each pixel is electrically connected to the common line 13 with the contact hole 21 interposed therebetween.

An insulator 23 made of the silicon nitride layer or the silicon oxide layer is formed over the entire surface of the transparent substrate 11 where the lower electrode 22 and the first transparent conductive films 38 and 39 are formed thereon. At this time, the surface of the passivation film 17 where the contact hole is to be formed on the drain electrode D and the surfaces of the first transparent conductive films 38 and 39 are also covered by the insulator 23. Then, by using photolithography and an etching method, a contact hole 24 is formed in the passivation film 17 and the insulator 23 where the contact hole is to be formed on the drain electrode D, and openings 36b and 37b are respectively formed in the insulator 23 placed on the surfaces of the first transparent conductive films 38 and 39. The contact hole 24 and the openings 36b and 37b may be formed by adopting a plasma etching method, which is a kind of dry-etching method, and a wet etching method using buffer hydrofluoric acid. In FIG. 1, although the insulator 23 appears on the entire surface excluding a portion of an upper electrode 26, which will be explained later, the insulator 23 is not shown for easy understanding of the liquid crystal display panel 10A.

Therefore, the drain electrode D is exposed to an etching atmosphere for the first time here, but because the first transparent conductive films 38 and 39 are present on the surface of the wirings 34 and 35 for mounting terminals, the wirings 34 and 35 for mounting terminals are not directly exposed to the etching atmosphere, while the openings 36b and 37b are being formed. Accordingly, the wirings 34 and 35 for mounting terminals will not be damaged again or corroded, while the openings 36b and 37b are being formed.

The openings 36b and 37b are formed smaller than the contact hole 36a formed in the gate insulator 14 and the passivation film 17 on the wiring 34 for a mounting terminal, and the contact hole 37a formed in the passivation film 17 on the wiring 35 for a mounting terminal. Consequently, the insulator 23 on the first transparent conductive films 38 and 39 partially covers the first transparent conductive films 38 and 39 at the peripheral side of the openings 36b and 37b. By adopting the configuration, because the insulator 23 is formed up to the inner circumference of the contact holes 36a and 37a, for example, even if the insulator 23 is rapidly etched in the etching atmosphere and eroded to the walls of the contact holes 36a and 37a, the peripheries of the contact holes 36a and 37a, which are mounting portions of the respective mounting terminal portions 33A and 33B, will not be eroded. This is because the area of the surface covered by the insulator 23 is large, and it is possible to maintain the height of the mounting portions. Accordingly, variation in height rarely occurs in the respective mounting terminal portions 33A and 33B, thereby enabling to prevent the generation of a non-contact portion. With the insulator 23, portions formed on the surfaces of the first transparent conductive films 38 and 39 present on the wirings 34 and 35 for mounting terminals correspond to a second insulator.

The transparent conductive layer made of, for example, ITO and IZO is covered over the entire surface of the transparent substrate 11 formed with the insulator 23. Then, by using photolithography and an etching method, the upper electrode 26 of which a plurality of slits 25 is formed on the surface of the insulator 23 is formed in each pixel, and second transparent conductive films 41 and 42 are respectively formed, so as to cover the surfaces of the first transparent conductive films 38 and 39, and the insulator 23 around the first transparent conductive films 38 and 39. The second transparent conductive films 41 and 42 are in contact with the surfaces of the respective first transparent conductive films 38 and 39 through the openings 36b and 37b formed in the insulator 23, and respectively correspond to the mounting terminals. The array substrate AR of the liquid crystal display panel 10A according to the first embodiment is then completed, by providing an alignment layer (not shown) on the entire surface that includes the upper electrode 26 of the display portion.

In the present embodiment, the lower electrode is the common electrode, and the upper electrode is the pixel electrode. However, for example, the lower electrode may be connected to the drain electrode D as the pixel electrode, and the upper electrode may be the common electrode and electrically connected to the common line 13 arranged in the pixel or at the periphery of the display region.

With the conductive material of the mounting terminal portion arranged outside the display region, the first transparent conductive films 38 and 39, and the second transparent conductive films 41 and 42 may be formed not only by the transparent electrode such as ITO and IZO, but also by a conductive light shielding film such as aluminum, molybdenum, titanium, and chromium.

With a color filter substrate CF, as shown in FIG. 2, a black matrix 28 is formed so as to cover a position that corresponds to the scanning line 12, the signal line 16, and the TFT of the array substrate AR, on the surface of a second transparent substrate 27. On the surface of the second transparent substrate 27 surrounded by the black matrix 28, a color filter layer 29 in a predetermined color is formed, and an overcoat layer 30 is formed so as to cover the surfaces of the black matrix 28 and the color filter layer 29. On the surface of the overcoat layer 30, an alignment layer (not shown) is formed, thereby completing the color filter substrate CF.

The array substrate AR and the color filter substrate CF are opposed to each other, so as the upper electrode 26 of the array substrate AR and the color filter layer 29 of the color filter substrate CF are opposed to each other. The FFS mode liquid crystal display panel 10A according to the first embodiment can be obtained, by injecting liquid crystal 31 therebetween.

With the liquid crystal display panel 10A according to the first embodiment manufactured in this manner, the mounting terminal portions 33A and 33B formed at the periphery of the display region can be manufactured while the display portion is being manufactured. Also, the wirings 34 and 35 for mounting terminals are exposed to the etching atmosphere only once, while forming the contact holes or the openings in the various insulators formed on the surface. Therefore, with the liquid crystal display panel 10A according to the first embodiment, the wirings 34 and 35 for mounting terminals can be prevented from being damaged by the etching atmosphere. Consequently, the problems such as the increase in wiring resistance due to disconnection and corrosion rarely occur, when various members are mounted on the second transparent conductive films 41 and 42 that correspond to the mounting terminal. As a result, it is possible to obtain the FFS mode liquid crystal display panel 10A with improved reliability of the mounting terminal portions 33A and 33B.

Second Embodiment

The transmissive FFS mode liquid crystal display panel is exemplified as the liquid crystal display panel 10A of the first embodiment, but a semi-transmissive FFS mode liquid crystal display panel may also be used. A configuration of a semi-transmissive FFS mode liquid crystal display panel 10B as a second embodiment will now be explained with reference to FIGS. 5 and 6. In the liquid crystal display panel 10B according to the second embodiment, the same components as those of the liquid crystal display panel 10A according to the first embodiment are denoted by the same reference numerals, and the detailed descriptions thereof are omitted.

The configuration of the semi-transmissive FFS mode liquid crystal display panel 10B according to the second embodiment is different from that of the transmissive FFS mode liquid crystal display panel 10A according to the first embodiment, in that concaves and convexes are formed at a part of the surface of the planar film 18 (not shown), and a reflector 19 made of light reflective metal is formed on the surface of the planar film 18 formed with the concaves and convexes. The reflector 19 is disposed between the surface of the planar film 18 and the lower electrode 22. Therefore, with the liquid crystal display panel 10B according to the second embodiment, at portions where the upper electrode 26 is respectively formed, a portion where the reflector 19 is formed forms a reflective portion 20, and the other portion forms a transmissive portion. As for the light reflective metal, aluminum, aluminum alloy, silver, or the like, which are used as versatile reflector forming material of the semi-transmissive liquid crystal display panel, may be appropriately selected and used.

In the liquid crystal display panel 10B according to the second embodiment, a light reflective metal film is formed on the entire surface after the planar film 18 is formed, and by using photolithography and an etching method, the reflector 19 is formed. Subsequently, by using photolithography and an etching method, the light reflective metal film of the other portion, excluding the portion of the reflector 19 of each pixel is removed. By continuing the etching, the contact holes 21 and 36a are respectively formed in the gate insulator 14 and the passivation film 17 on the surfaces of the common line 13 and the wiring 34 for a mounting terminal associated with the mounting terminal portion 33A for lower wiring, and the contact hole 37a is formed in the passivation film 17 on the wiring 35 for a mounting terminal associated with the mounting terminal portion 33B for upper wiring. The subsequent manufacturing process is the same as that of the liquid crystal display panel 10A according to the first embodiment.

The configurations of the mounting terminal portions 33A and 33B formed at the periphery of the display region in the liquid crystal display panel 10B according to the second embodiment, is the same as those in the liquid crystal display panel 10A according to the first embodiment. Therefore, with the liquid crystal display panel 10B according to the second embodiment, it is possible to obtain the semi-transmissive FFS mode liquid crystal display panel that offers the same advantages as the liquid crystal display panel 10A according to the first embodiment.

Modifications of the first embodiment will now be explained with reference to mounting terminal portions 33C to 33E shown in FIGS. 7A, 7B and 7C. The same components as those of the liquid crystal display panel 10A according to the first embodiment are denoted by the same reference numerals, and the detailed descriptions thereof are omitted. The following modifications are explained based on the lower wiring, but the modifications are also versatile with respect to the upper wiring.

First Modification

Figure 7A:
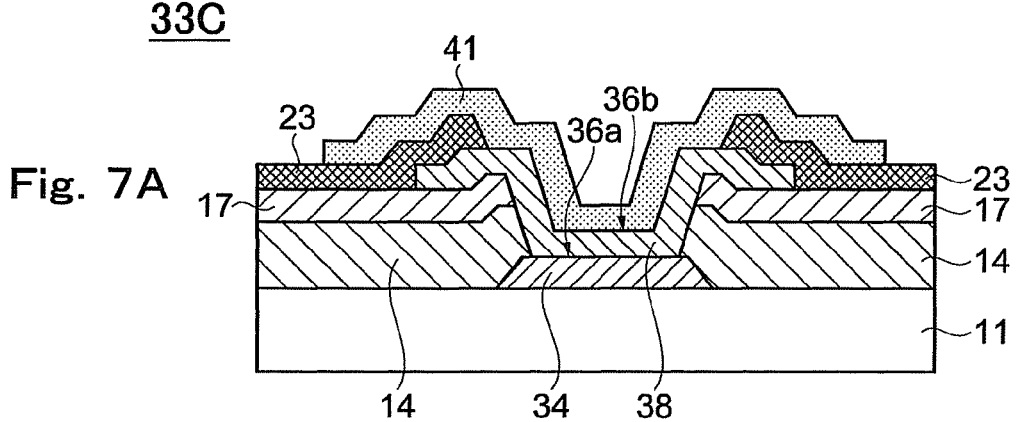
FIGS. 7A to 7C are schematic sectional views showing modifications of the terminal portion.

In the mounting terminal portion 33C shown in FIG. 7A, the insulator 23 is not formed to the bottom of the contact hole 36a, but is provided on both ends of the first transparent conductive film 38 (periphery of contact hole 36a). Accordingly, the contact area between the first transparent conductive film 38 and the second transparent conductive film 41 is larger than the contact area of the first embodiment. As a result, it is possible to reduce the resistance of each mounting terminal portion, thereby enabling to supply stable voltage.

Second Modification

Figure 7B:
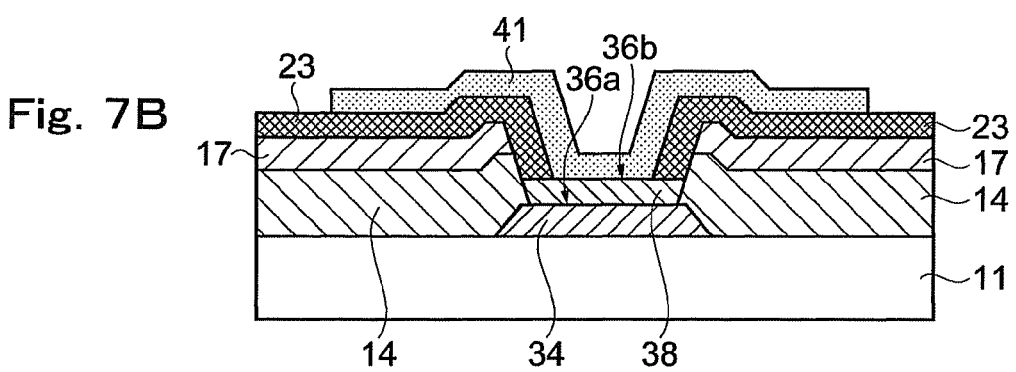

In the mounting terminal portion 33D shown in FIG. 7B, the first transparent conductive film 38 is formed so as to at least cover the bottom portion of the contact hole 36a electrically connected to the wiring 34 for a mounting terminal. More specifically, the first transparent conductive film 38 covers the bottom portion of the contact hole 36a (upper portion of wiring 34 for a mounting terminal), the insulator 23 is formed thereon so as to expose the contact portion between the first transparent conductive film 38 and the wiring 34 for a mounting terminal, and the second transparent conductive film 41 is provided on the top surface. This is the configuration that the surface of the wiring 34 for a mounting terminal is at least covered by the first transparent conductive film 38, thereby enabling to prevent the wiring 34 for a mounting terminal to be exposed to the etching atmosphere. As a result, it is possible to protect the wiring 34 for a mounting terminal further effectively.

Third Modification

Figure 7C:
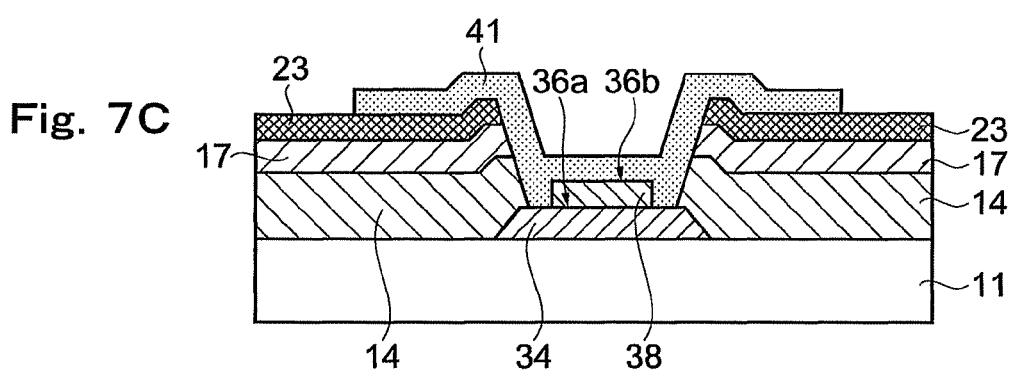
Figure 8A:
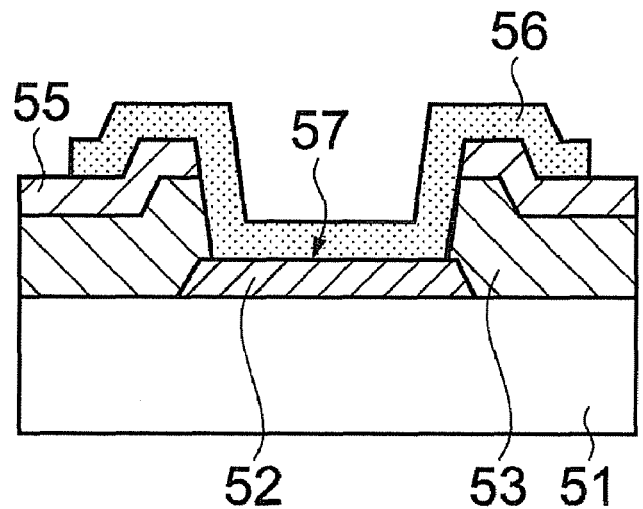
FIG. 8A is a sectional view of a related art mounting terminal portion of a lower wiring.
Figure 8B:
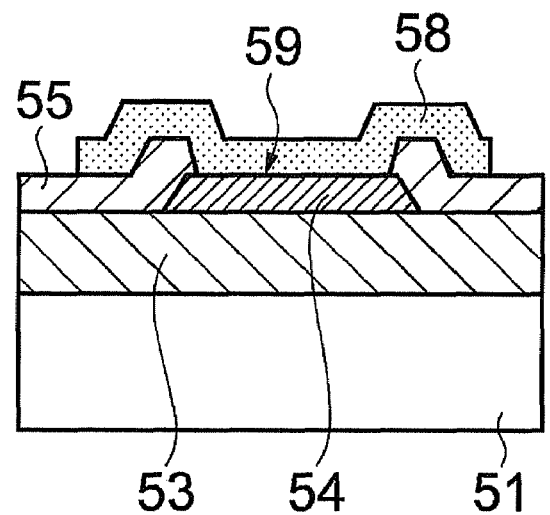
FIG. 8B is a sectional view of a related art mounting terminal portion of an upper wiring.

In the mounting terminal portion 33E shown in FIG. 7C, the first transparent conductive film 38 is formed at a part of the region (for example, middle portion excluding both ends) of the bottom portion of the contact hole 36a and covers the upper portion of the wiring 34 for a mounting terminal, the insulator 23 is formed at the periphery of the contact hole 36a, and the second transparent conductive film 41 is provided so as to cover thereof. This is the configuration that, for example, the both ends of the wiring 34 for a mounting terminal are exposed a little, and only the surface of the middle portion is covered by the first transparent conductive film 38, so as to prevent the wiring 34 for a mounting terminal from being exposed to the etching atmosphere. With this configuration, in the forming region, even if the exposed surface is damaged to some extent in the etching atmosphere, it is possible to protect the wiring 34 for a mounting terminal.

What is claimed is:

1. A liquid crystal display panel comprising:
   an array substrate having a display region and a mounting terminal portion formed at a periphery of the display region,
   the display region having a plurality of scanning lines and signal lines formed in a matrix, and a lower electrode and an upper electrode that has a plurality of slits, each of the lower and upper electrodes being made of a transparent conductive material formed on a planar film, and disposed opposite to each other with an insulator interposed therebetween in each region surrounded by the scanning lines and the signal lines,
   the mounting terminal portion including:
   a first insulator that covers a surface of a wiring for a mounting terminal,
   a contact hole formed so as to penetrate through the first insulator on the wiring for a mounting terminal,
   a first conductive film that at least covers part of a bottom portion of the contact hole and is electrically connected to the wiring for a mounting terminal,
   a second insulator that is provided on a surface of the first insulator, that covers a portion of the first conductive film, and has an opening at least part of which is overlapped with the contact hole in a planar view and
   a second conductive film that covers a surface of the second insulator around the contact hole such that a portion of the second insulator is formed between and directly contacts the first conductive film and the second conductive film, and a portion of the second insulator extends between the first conductive film and the second conductive film into an interior of the contact hole so as to cover a portion of the first conductive film at a bottom portion of the contact hole, and
   the first conductive film and the second conductive film being electrically connected in the opening, wherein the first conductive film and the second conductive film are formed of a same material as the lower electrode and the upper electrode, respectively, and the second insulator is formed of a same material as the insulator disposed between the lower electrode and the upper electrode.

2. The liquid crystal display panel according to claim 1, wherein the second insulator covers an inner circumference surface and a peripheral surface of the contact hole, and includes the opening having a smaller diameter than the diameter of the contact hole at a vicinity of a middle portion of the contact hole.

3. The liquid crystal display panel according to claim 1, wherein the second insulator is formed at a periphery of the contact hole.

4. The liquid crystal display panel according to claim 1, wherein the first conductive film is electrically connected to the wiring for a mounting terminal, and formed so as to cover the bottom portion of the contact hole.

5. The liquid crystal display panel according to claim 1, wherein the first conductive film is electrically connected to the wiring for a mounting terminal, and formed at a part of a region on the surface of the wiring for a mounting terminal.

6. A liquid crystal display panel comprising:
   an array substrate having a display region and a mounting terminal portion formed at a periphery of the display region,
   the display region having a plurality of scanning lines and signal lines formed in a matrix, and a lower electrode and an upper electrode that has a plurality of slits, each of the lower and upper electrodes being made of a transparent conductive material formed on a planar film, and disposed opposite to each other with an insulator interposed therebetween in each region surrounded by the scanning lines and the signal lines,
   the mounting terminal portion including:
   a first insulator that covers a surface of a wiring for a mounting terminal,
   a contact hole formed so as to penetrate through the first insulator on the wiring for a mounting terminal,
   a first conductive film that at least covers part of a bottom portion of the contact hole and is electrically connected to the wiring for a mounting terminal,
   a second insulator that is provided on a surface of the first insulator, that covers a portion of the first conductive film, and has an opening at least part of which is overlapped with the contact hole in a planar view and
   a second conductive film that covers a surface of the second insulator around the contact hole such that a portion of the second insulator is formed between and directly contacts the first conductive film and the second conductive film, and a portion of the second insulator extends between the first conductive film and the second conductive film into an interior of the contact hole so as to cover a portion of the first conductive film at a bottom portion of the contact hole, and
   the first conductive film and the second conductive film being electrically connected in the opening, wherein the wiring for a mounting terminal is formed of a same metal material as that of the scanning lines in the display region, and the first insulator is formed of a multilayer film made of a same material as a gate insulator that covers over the scanning lines and a passivation film that covers over the signal lines in the display region.

7. A liquid crystal display panel comprising:
   an array substrate having a display region and a mounting terminal portion formed at a periphery of the display region,
   the display region having a plurality of scanning lines and signal lines formed in a matrix, and a lower electrode and an upper electrode that has a plurality of slits, each of the lower and upper electrodes being made of a transparent conductive material formed on a planar film, and disposed opposite to each other with an insulator interposed therebetween in each region surrounded by the scanning lines and the signal lines,
   the mounting terminal portion including:
   a first insulator that covers a surface of a wiring for a mounting terminal,
   a contact hole formed so as to penetrate through the first insulator on the wiring for a mounting terminal, a first conductive film that at least covers part of a bottom portion of the contact hole and is electrically connected to the wiring for a mounting terminal, a second insulator that is provided on a surface of the first insulator, that covers a portion of the first conductive film, and has an opening at least part of which is overlapped with the contact hole in a planar view and a second conductive film that covers a surface of the second insulator around the contact hole such that a portion of the second insulator is formed between and directly contacts the first conductive film and the second conductive film, and a portion of the second insulator extends between the first conductive film and the second conductive film into an interior of the contact hole so as to cover a portion of the first conductive film at a bottom portion of the contact hole, and the first conductive film and the second conductive film being electrically connected in the opening, wherein the wiring for a mounting terminal is formed of a same metal material as that of the signal lines in the display region, and the first insulator is formed of a film made of a same material as the passivation film that covers over the signal lines in the display region.

8. The liquid crystal display panel according to claim 1, further comprising:

a reflector formed partially between the planar film and the lower electrode in the display region.

9. A manufacturing method of a liquid crystal display panel that includes a plurality of scanning lines and signal lines formed in a matrix, a display region that includes a lower electrode and an upper electrode having a plurality of slits, each of the lower and upper electrodes being formed of a transparent conductive material formed on a planar film, and disposed opposite to each other with an insulator interposed therebetween in each region surrounded by the scanning lines and the signal lines, and a mounting terminal portion formed around the display region, the manufacturing method comprising:

manufacturing the mounting terminal portion through (1) to (7):

forming a wiring for a mounting terminal in predetermined pattern formed of a same material as one of the scanning lines and the signal lines, at a mounting terminal forming position on a substrate surface;

covering a surface of the wiring for a mounting terminal by a first insulator;

forming a contact hole so as to penetrate through the first insulator on the wiring for a mounting terminal;

forming a first conductive film formed of a same material as the lower electrode, so as to cover at least part of a bottom portion of the contact hole and to be electrically connected to the wiring for a mounting terminal;

forming a second insulator having a same composition as the insulator disposed between the lower electrode and the upper electrode of the display region, on a surface of the first insulator;

forming an opening at least part of which is overlapped with the contact hole in a planar view, in the second insulator; and forming a mounting terminal made of a second conductive film formed of a same material as the upper electrode so as to cover a surface of the second insulator around the contact hole such that a portion of the second insulator is formed between and directly contacts the first conductive film and the second conductive film, and to be electrically connected to the first conductive film in the opening, and a portion of the second insulator extends between the first conductive film and the second conductive film into an interior of the contact hole so as to cover a portion of the first conductive film at a bottom portion of the contact hole.

* * * * *